(12) United States Patent
Fodor et al.

(10) Patent No.: US 7,577,489 B2
(45) Date of Patent: Aug. 18, 2009

(54) METHOD AND DEVICE FOR MEASURING, DETERMINING AND CONTROLLING FLATNESS OF A METAL STRIP

(75) Inventors: George Fodor, Västerås (SE); Christine Mikkelsen, Västerås (SE)

(73) Assignee: ABB AB, Västerås (SE)

( * ) Notice: Subject to any disclaimer, the term of this patent is extended or adjusted under 35 U.S.C. 154(b) by 139 days.

(21) Appl. No.: 10/585,125

(22) PCT Filed: Dec. 30, 2004

(86) PCT No.: PCT/SE2004/002059

§ 371 (c)(1),
(2), (4) Date: Jul. 9, 2007

(87) PCT Pub. No.: WO2005/064270

PCT Pub. Date: Jul. 14, 2005

(65) Prior Publication Data

US 2007/0271977 A1    Nov. 29, 2007

(30) Foreign Application Priority Data

Dec. 31, 2003 (SE) .................................. 0303617

(51) Int. Cl.
*G06F 19/00* (2006.01)
*G05B 13/02* (2006.01)

(52) U.S. Cl. ................... 700/154; 700/30; 700/31; 700/173; 700/180; 703/2

(58) Field of Classification Search .............. 700/28–31, 700/154, 165, 173, 180, 182, 206; 703/2, 703/6, 7; 715/700, 961, 964, 965
See application file for complete search history.

(56) References Cited

U.S. PATENT DOCUMENTS

| | | | |
|---|---|---|---|
| 3,481,194 A | 12/1969 | Sivilotti et al. | |
| 4,400,957 A | 8/1983 | Carlstedt et al. | |
| 4,551,805 A * | 11/1985 | Shimoda et al. | 700/122 |
| 4,700,312 A * | 10/1987 | Kikuma et al. | 700/150 |
| 4,736,305 A * | 4/1988 | Watanabe | 700/154 |
| 5,287,433 A * | 2/1994 | Prunotto et al. | 700/264 |
| 5,535,129 A * | 7/1996 | Keijser | 700/148 |
| 5,583,639 A | 12/1996 | Rostvall | |
| 5,727,127 A * | 3/1998 | Schulze Horn et al. | 706/52 |
| 6,275,032 B1 | 8/2001 | Iwata et al. | |
| 6,351,269 B1 | 2/2002 | Georgiev | |
| 6,411,862 B1 * | 6/2002 | Hazama et al. | 700/182 |
| 6,463,352 B1 * | 10/2002 | Tadokoro et al. | 700/169 |

FOREIGN PATENT DOCUMENTS

EP    1 110 635 A1    6/2001

* cited by examiner

*Primary Examiner*—Sean P Shechtman
(74) *Attorney, Agent, or Firm*—Venable LLP; Eric J. Franklin (57) ABSTRACT

A method for optimizing measurement and control of the flatness of a strip of rolled material. A mapping is accomplished by associating to relevant flatness fault types a reference strip model and an actuator space conversion matrix. A device for optimizing measurement and control of the flatness of a strip of rolled material.

23 Claims, 5 Drawing Sheets

| | a | b | c | d | e | f | g | h | i | j |
|---|---|---|---|---|---|---|---|---|---|---|
| INDICATED FLATNESS PROFILE | | | | | | | | | | |
| APPEARANCE OF STRIP | FLAT | CAMBER | CENTRE BUCKLES | EDGE WAVES | LONG CENTRE AND EDGE WAVES | PIECRUST EDGE | RIDGES | QURTER BUCKLES | CENTRE RIDGES | HERRING BONE |
| CONTROL ORDER | | | | | | | | | | |

METHOD AND DEVICE FOR MEASURING, DETERMINING AND CONTROLLING FLATNESS OF A METAL STRIP

CROSS-REFERENCE TO RELATED APPLICATIONS

This application claims priority to Swedish patent application 0303617-5 filed 31 Dec. 2003 and is the national phase under 35 U.S.C. § 371 of PCT/SE2004/002059.

TECHNICAL FIELD OF THE INVENTION

The invention relates to a method and a device for measuring, determining and controlling flatness of a substantially long and flat sheet or strip of material, such as copper, steel, aluminium or other materials such as plastics, in a continuous or semi-continuous production process.

More particularly it is a method and device for measuring, determining and controlling flatness in a cold or hot rolling mill.

The invention further deals with a method and device for measuring, determining and controlling flatness using human-machine interfaces and control algorithms.

BACKGROUND OF THE INVENTION

Figure 1:
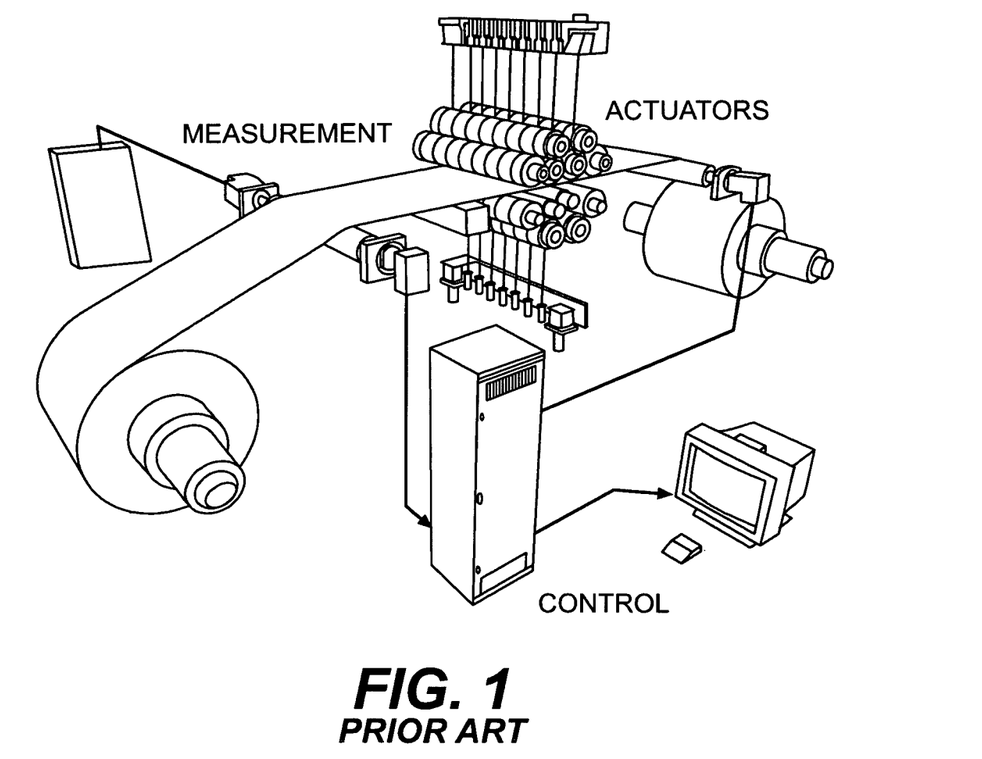
FIG. 1 illustrates a known flatness control equipment.

In the rolling of strip and sheet materials it is common practice to roll a material to the desired dimensions in a cold or hot rolling mill stand and then feed the resulting strip to a coiler where it is wound up into a coil. In FIG. 1 a flatness control is illustrated that typically comprises of three main parts, measurement, control and actuators, that correct the flatness error. The difficulty with the flatness control consists on achieving a very good flatness in spite of certain known limitations. The reason why the flatness is not always perfect, is that all three parts have a number of limitations.

The measurement is for example often discrete both across the width of the strip, as it has a limited number of measurement zones, and along the strip, as there are only a limited number of measurements done per rotation (say, four measuring zones in the rotational direction). The control has a complex mathematics that cannot always follow at the speed of the strip and the actuators are only correcting certain type of errors and it is not sure they can correct any shape of flatness error. For example, a bending and a tilting actuator can correct only a shape that is a sum of a parable and a straight line, but of course the flatness error can in principle have any irregular shape.

A metal strip that is subject to different degrees of reduction across its width will be elongated in varying length over different sections of the strip. Normally, the reduction results in certain pre-defined stress profiles for the strip.

The difference between the measured strip flatness and a target flatness curve is defined as the "flatness error". Practically, the flatness error of the strip can be gauged by a special measuring roll, e.g. a Stressometer roll, an ABB product.

PRIOR ART

Several different methods have been developed to correct the flatness error by a so-called flatness control operation. All of these methods are based upon local modifications of the gap between rolls.

The tension in the strip between a mill stand and a coiler is carefully monitored and it is known to measure tension distribution across a strip in order to regulate the flatness of the rolled material.

In U.S. Pat. No. 3,481,194 Sivilotti and Carlsson disclose a strip flatness sensor. It comprises a measuring roll over which the strip passes between a mill stand and, for this example, a coiler. The measuring roll detects the pressure in a strip at several points across the width of the strip. The pressure represents a measure of the tension in the strip. The measurements of tension in the strip result in a map of flatness in each of several zones across the width of the strip.

U.S. Pat. No. 4,400,957 discloses a strip or sheet mill in which tensile stress distribution is measured to characterize flatness. The measures of flatness are compared to a target flatness and a difference between measured flatness and target flatness is calculated, as a flatness error. The flatness error is fed back to a control unit of the mill stand, so as to regulate and control flatness in the strip in order to approach a zero flatness error.

Discrete flatness sensors and rolling mills with several actuators have drawbacks in that the sensors are not measuring continuously. This means that certain types of flatness errors are not detected. In addition to this, due to physical limitations, actuators cannot correct any type of flatness error, even if these are detected.

One further disadvantage is increased complexity in sensor processing, actuator response prediction and the need of precise mathematical mappings between these sensors and actuators. This complexity can be overcome by an optimization operation of the unflatness and control.

Normally the optimization of the flatness is done by different compensations of the space mapping function. These involve a great deal of numerical and process control methods. Typical examples are artificial neural networks, multivariable control, adaptive control, etc. These are difficult for plant operators to understand and handle.

Moreover, though additional information may be available for the operator from e.g. visual inspection of the strip, the operator cannot easily translate this information into the existing mathematical formalism of the flatness control. For example, the operator may see certain patterns on the strip like "quarter-buckles", but it is not obvious how he may use this information to amend the flatness control paradigm.

In the following the background of the generic control algorithms for control equipments will be described for the purpose of later understanding of the invention. In doing this, references will be made to the following parameters:

N=Number of measurement zones (number of measured samples along the width of the strip)

P=Number of actuators $b_i$=Flatness error for zone i (i=1, ..., N) The vector b={$b_i$} is the flatness error space $a_{i,j}$=Actuator effect corresponding to measurement zone i for actuator j, (i=1, ..., N; j=1, ..., P)

A=The mill matrix, with components $a_{i,j}$ used for space mapping $x_j$=actuator parameter to calculate, normalized in range [0, ..., 1], the vector x={$x_i$} is the actuator space $A^T$=Means the transpose of a matrix A $R^n$=It is the space of real n-dimension vectors {$x_1, x_2, ..., x_n$}.

The term space denotes a vector space. We use the vector space of matrices of different sizes and the vector space of polynomials.

The mill matrix A is obtained from the mill manufacturer, from measurements or identification operations, and the flatness error matrix b is measured on-line with the flatness measurement device (such as a measurement roll). These matrices are related to the actuator parameter matrix x by the following formula:

$$Ax=b \qquad (1)$$

Flatness control means generally finding the vector x when the vector A is a given constant and b is measured on-line. Since A is not a square matrix (in general N≧P), there are more equations N than unknowns P for the system of equations represented by (1). That means, in general, (a) there is no a unique solution and (b) the solution is not exact, i.e. there can be found an x such that b is "close" to Ax. Here "close" is in terms of a Euclidian distance expressed as a norm in the $R^N$ space.

If x varies and if the columns of A are linearly independent, then the product Ax describes a space on $R^N$ called "the column space of A" or "the range of A"—notation R(A), or "the span of the columns of A". The column space gives all the flatness error correction possibilities a rolling mill can have with its actuator equipment described by matrix A. It is known from elementary geometry in 2D/3D spaces and from functional analysis in N-space that the closest distance is given by an orthogonal projection: the smallest distance between b and Ax is the projection of b on the space of Ax, see FIG. 2.

Figure 2:
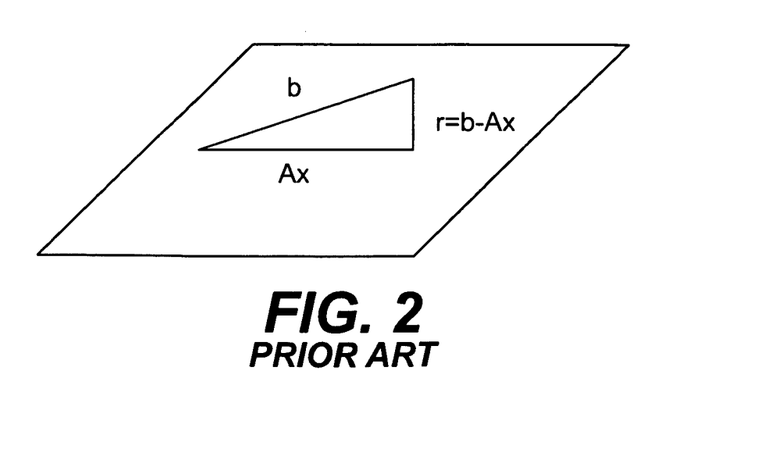
FIG. 2 illustrates a simple orthogonal projection.

Two arbitrary vectors v and w are orthogonal when their inner product denoted <v, w> is zero. For a matrix vector space, the inner product is defined as the product $v^Tw$, so orthogonality means $v^Tw=0$. For our case, let r=b−Ax be the residual (the error between a solution Ax and the vector b). The smallest residual is the orthogonal projection of r onto Ax, which according to the definition is:

$$0=A^Tr=A^T(b-Ax) \qquad (2)$$

By separating the terms, we obtain:

$$A^TAx=A^Tb \qquad (3)$$

This is called in literature the normal equation. The factor $A^TA \in R^{N \times N}$ is called the Gram matrix of A (is always a symmetric square matrix). Multiplying (2) with $(A^TA)^{-1}$ we obtain x:

$$x=(A^TA)^{-1}A^Tb=A^{PL}b \qquad (4)$$

The term $A^{PL}=(A^TA)^{-1}A^T$ is called the left pseudo-inverse matrix of A.

The formula (4) above is used for instance for the "model-based method" in the existing ABB Stressometer 5.0/6.0 flatness control equipment and also by a majority of other producers of flatness control equipment. Other descriptions of this method appear under the names such as "least square method", "orthogonal vectors" or "residual square minimization", however, all of these are less general formulations of the vector space and orthogonal projection described above. For example orthogonal vectors may be obtained by a Gram-Schmidt orthogonalization procedure; however the orthogonalization is just another way of computing the pseudo-inverse. The proposed method applies for all these computations or others that are equivalent.

Image morphing (short for image metamorphosis) is a popular technique for creating a smooth transition between two 2D images. Morphing is the process of changing one object to another one. The method can be applied to volume-based representations of objects and the result is a smooth transition between two 3D objects (3D metamorphosis or 3D morphing). There are several different algorithms to create the transition depending on the intended function.

If the objects have the same number of polygons and vertices and the morphing is done to 100% the result is that the first object is transformed to an object identical to the one you morphed it with. I.e. if the two objects are a sphere and a cube you can morph the sphere to be identical to the cube if they have the same number of polygons and vertices. You can also choose to morph the objects to i.e. 50% and then you end up with a merge of a sphere and a cube.

If the objects have different number of polygons or vertices you have to build a map between the vertices of one object and the vertices of the other. Therefore you do not end up with a morph shape looking identical to the one you morphed it with even if you morph the objects to 100%.

The method can be applied to volume-based representations of objects and the result is a smooth transition between two 3D objects (3D metamorphosis or 3D morphing). There are several different algorithms to create the transition depending on the intended function.

SUMMARY OF THE INVENTION

As strip products with a high degree of flatness are essential for the competitiveness of mills today, the object of the present invention is to solve above indicated problems and present a new method and a device for improving flatness control to achieve a very good flatness by measuring, determining and controlling the flatness of a substantially long and flat sheet or strip of material.

Flatness Control, FC, essentially maps points moving in the multidimensional space of the measured flatness error into points determined in the multidimensional space of the actuators such that certain optimality conditions are met. This is the traditional mapping used today in FC, we call this as the 'first mapping'.

The first mapping is often difficult to optimize due to the nature of the actuator space and due to the sensor data vs. reference values used for the computation of the flatness error. For instance the complete action of all the actuators is not linear in the individual actuators, it cannot produce the optimal mapping or the mapping (possible combinations of actuator positions) is not unique.

Another factor that limits the control is the discrete nature of the measurement. A discretization is inherent with most of the current measurement technologies both across the strip width (the measurement zones of the measuring roll) and along the strip length (sensors measuring when in contact with the strip).

The present invention proposes a solution to the problems discussed above by introducing a second mapping. This second mapping can be made from reference models such as video samples or mathematical functions to output space optimization matrices. The reference models enter into the computation of the main mapping. The result is increased accuracy and locality of the flatness control. A further advantage is a vast increase in sampling granularity that translates into more accurate and timely flatness control.

The method of the invention is achieved by, that a second mapping is made to optimization algorithms acting in actuator model and sensor spaces using visual or image information, and that the measured flatness vector is enhanced with information from a virtual strip.

The present invention applies to any type of flatness measurement that is discrete in at least one dimension (along strip width, strip length or both), such as measurement device or contactless measurement devices with discrete sampling.

The present invention creates a mathematical map between the sensor space and the actuator space that improves substantially the deficiencies with known controlling methods. This comes from that extra information is entered into the system from the user, or from a visual sensor, about the nature of the flatness error and that this information is used in a better way to optimize the actuator behavior, for any type of known controller. Accordingly, a visual equipment and visual operation, on sensor data, such as sensor fusion or morphing is used in the method according to the invention, as well as a control architecture that implements a space mapping.

A method according to the present invention will increase the control speed substantially as the response time decreases.

BRIEF DESCRIPTION OF DRAWINGS

For better understanding of the present invention, reference will be made to the below drawings/figures.

DETAILED DESCRIPTION OF PREFERRED EMBODIMENTS

Flatness control, as used in metal rolling mill industry is, from a mathematical perspective, a mapping of an abstract space of sensor-originated vectors into a space of actuators. When fine-tuning the control to specific mill conditions, one uses traditional paradigms corresponding to the implemented mathematical level of the control, such as "transfer function", "poles and zeroes in the state space", "dynamic behavior", "least-squares" and different parameterization or penalty functions. With the advent of the IT and virtual reality architectures, it is increasingly the case that virtual strip models are available from video captures or mathematical models. Thus the idea is to move the tuning operation from the control abstract level up to the real physical properties that can be seen by an operator when using different visualization and virtual reality techniques.

The present invention presents a method to use the information contained in the virtual strip models to improve the flatness control algorithm. The main features of the invention are:

The measured flatness vector is enhanced with information from the virtual strip using a morphing technique (enhancement of the first space mapping).
By this operation the sampling granularity increases. That result in better and more accurate flatness control.
Since sampled data is available in shorter time interval, the control speed increases (response time decreases) substantially.
The virtual strip is mapped to a vector space optimization algorithm. This in effect is a second vector mapping that performs a fine, local adjustment of the control optimization (creation of a second space mapping).

In short, the invention states that increased flatness control precision can be achieved by a two-way space mapping in which visual or other continuous or near continuous a-priori strip information enhances (a) the measurement (b vector) and a traditional control loop and (b) the optimization algorithms that tells how x is computed such that to minimize the residual $|Ax-b|$.

Figure 3:
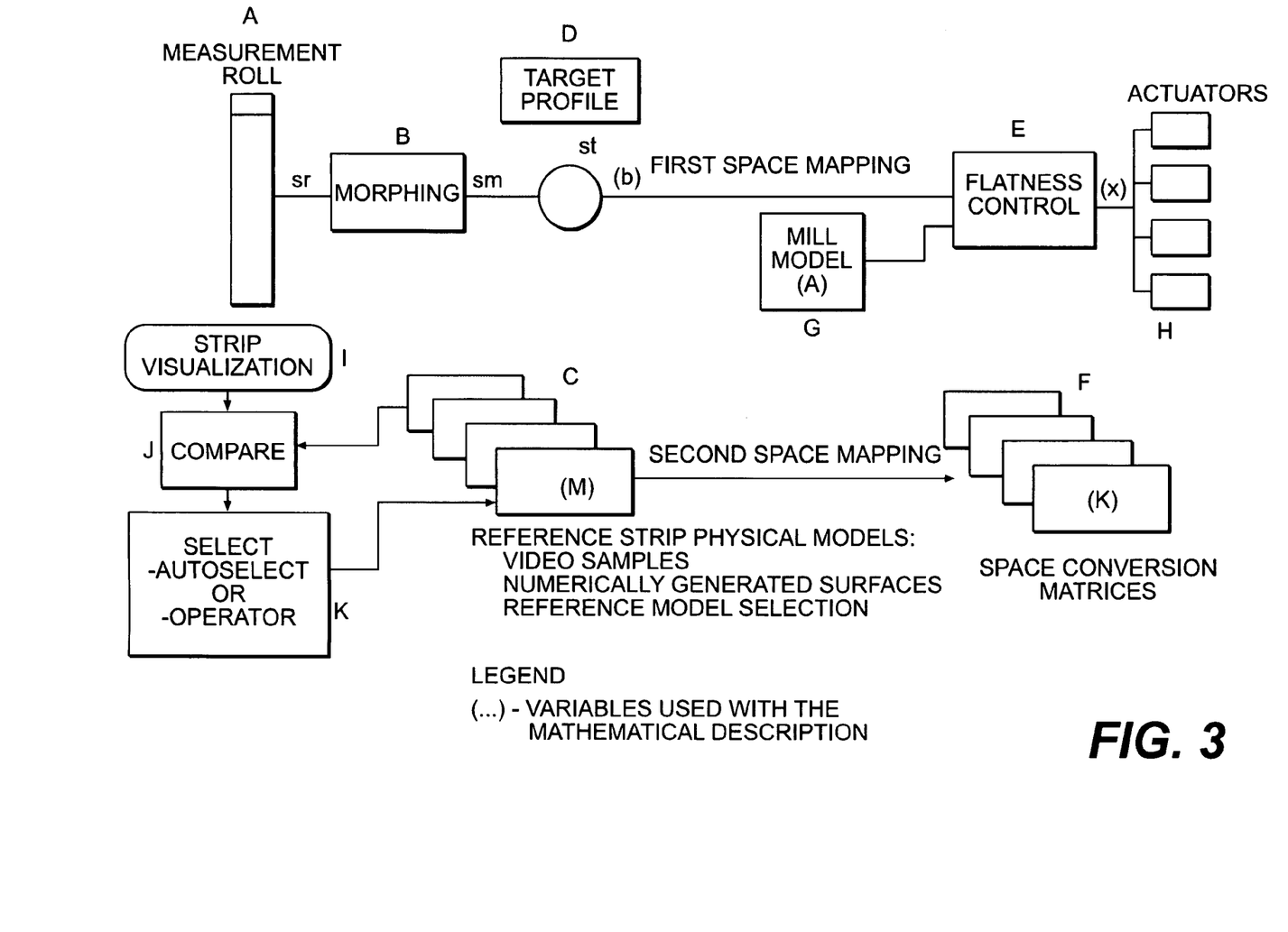
FIG. 3 illustrates a control system according to the invention.

In FIG. 3 is illustrated a control system according to the invention, where:

A is a flatness measurement device, that produces a vector of flatness values per each measurement zone.
B is a Morphing unit (software in existing equipment or dedicated device), that is a part of the HMI.
C denotes reference strip models used for morphing. These are picture files generated from video or using laser captures or results from mathematical modeling.
D are target stress profiles (reference). For the purpose of the method, the granularity of the target stress profile is the same as the granularity of the reference strip models.
E is flatness control computer executing the algorithm described above.
F are space conversion matrices that describe mathematically the local properties of the strip (edge, middle etc). Each matrix is mapped to a reference strip model.
G is a mill model, that is part of the existing flatness control, and it is a matrix ("the Mill Matrix").
H are actuators that correct flatness.
I is a device sensing the actual strip and converting this information into a format that allows comparison with reference strip models. This can be a measurement device such as visual camera, infrared camera or other devices capable of sensing strip relevant information, or a trained operator with visual access to the strip.
J is a device that allows comparison between the actual strip sensed and converted according to I, and reference strip models. This operation, again, can be manual or automatic. However, in case of automatic operation, the comparison was done at the time of the design of the automatic device.
K is a device that selects the best match between the sensed actual strip and the reference strip models.

Figure 4:
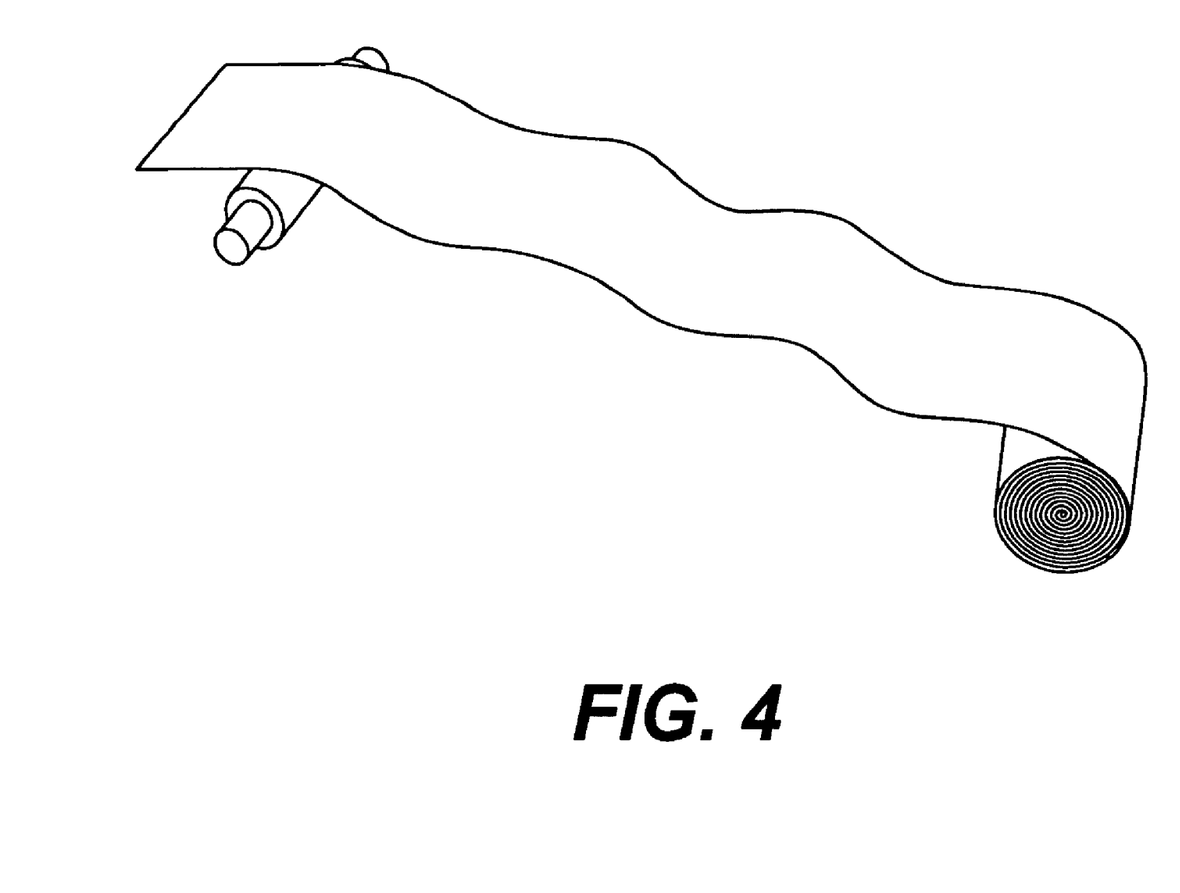
FIG. 4 illustrates a mathematical model generated strip.
Figure 6:
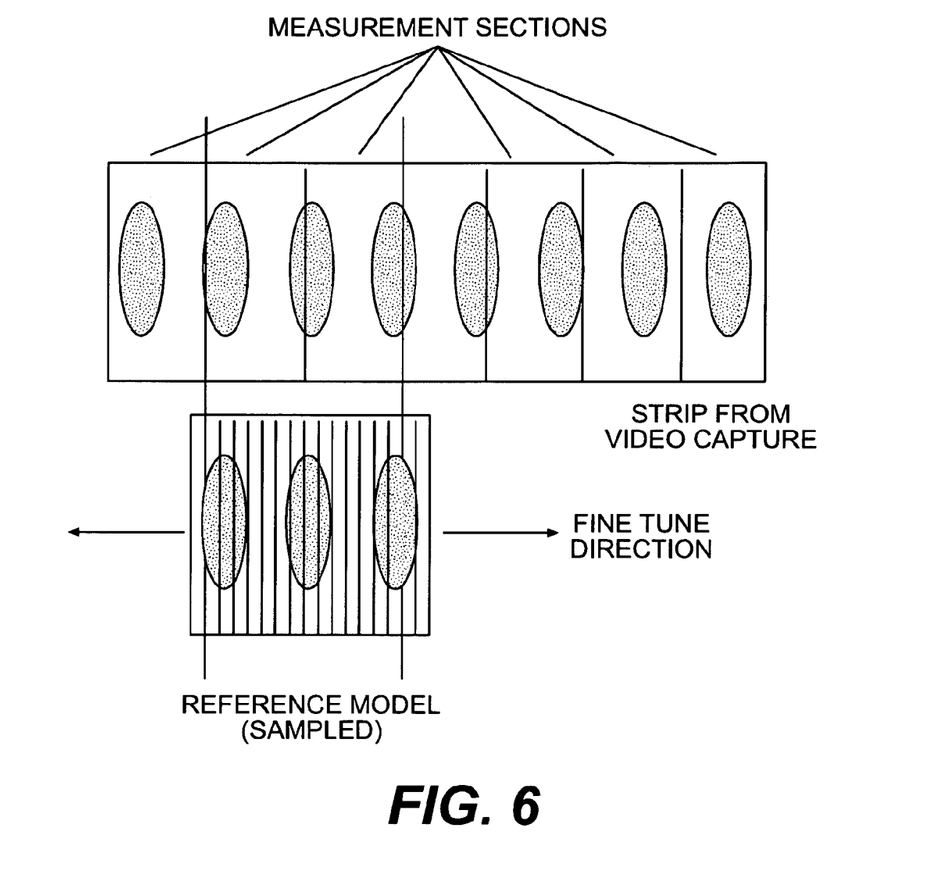
FIG. 6 illustrates the fine-tuning of the reference model or the synchronization of the sampling.

The mill operator has extra information about the nature of the flatness fault, for example from a video camera or by visual inspection. By contrast, the measured value contains only a truncated part of all this information due to the discrete sampling. A video frame can contain information at sub-millimeter granularity while the flatness measurement may have only granularity between 10 cm and up to 0.25 m. For example a video camera (or visual inspection) can show clearly so-called "quarter buckles" but when sampling with a flatness measurement device, these buckles are not completely detectable. This is illustrated in FIG. 6 on a strip picture generated from a video capture, discrete roll measurement samples may fall anywhere inside or outside buckles such that the buckles cannot be deduced from roll measurements alone. The visual information can be generated also from mathematical models (so called grey, white or black models), an example of a mathematically generated model strip is illustrated in FIG. 4. According to the invention all types of generated or photo/video captured images can be used.

According to the present invention, this information is added to the measured information from the reference model in order to improve the space mapping optimization. The information is typically morphed.

Figure 5:
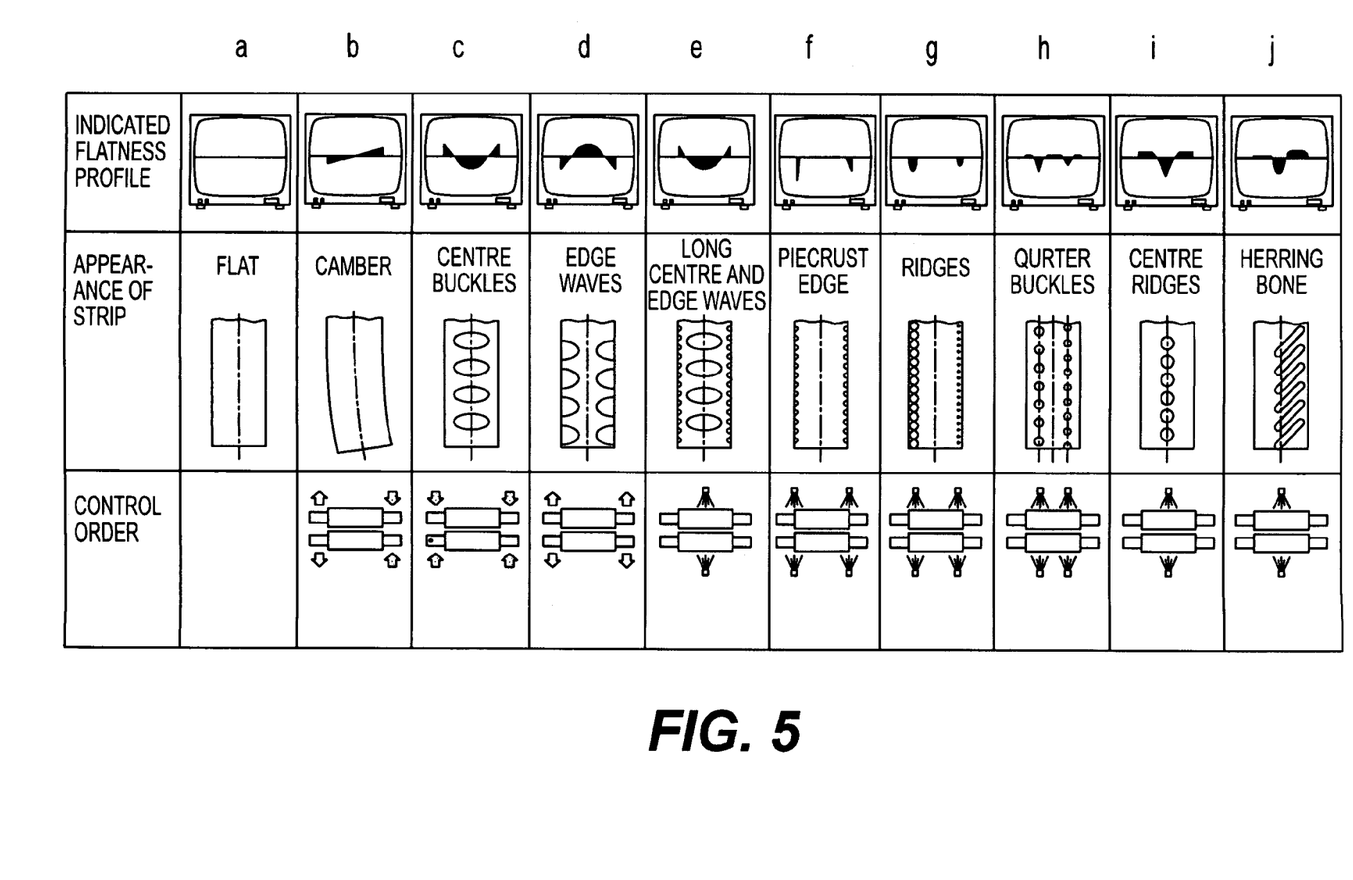
FIG. 5 illustrates a number of examples of flatness profiles.

The operator has a number of reference models that have as output stress profiles, see FIG. 5, that can be morphed with the real measurement data. These models are obtained for example from digital translations of video captures.

To accomplish the morphing the selected reference model need to be scaled and synchronized to match the measured data.

One alternative to do this is to make a visual mark on the strip (from video capture) where the measurement was done. This can be done for example by using a laser ray.

Figure 7:
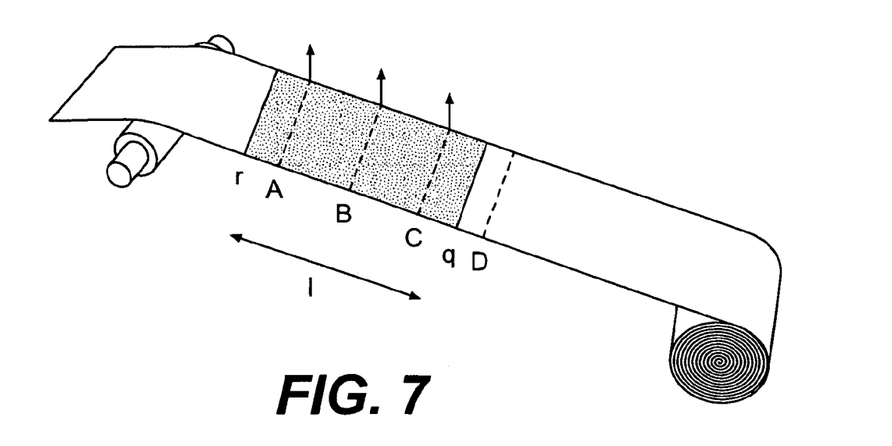
FIG. 7 illustrates an example of a continuous strip prediction.

In the graphical user interface the operator (or a pattern matching algorithm) can fine-tune the reference model horizontally to match the measured data. This method is shown in FIG. 7.

The morphing algorithm modifies the reference model according to the measurement data resulting in a data set that is closer to the reality.

The morphing function can be calculated in different ways but essentially every measured data point affects several reference model points gradually.

This new data set can be used to calculate a flatness error that is more accurate as compared to the existing system. The target profile is subtracted from the morphed profile (a vector subtraction) in order to compute a flatness error.

This operation can be performed if the granularity of the target and the morphed signal is the same. High granularity target profiles can be obtained by simply filling in repetitively the same profile until the required granularity is achieved, or by using pictures or video captures from a de post-facto strip processing as described in the Patent EP 1 110 635 A1 Method and device for controlling flatness (Jonsson, Meyer, 1999).

The resulting flatness error has a much higher granularity than what is traditionally obtained from the original measured samples. This has the effect that the flatness control will be more accurate, faster and has a better prediction capacity.

The mill operator has extra information about the nature of the flatness fault, e.g. from a video camera or visual inspection. By contrast, the measured value does not contain all this information due to sampling. For example a video camera (or visual inspection) can show so-called "quarter buckles" but when sampling with a discrete sampling measurement device, these buckles are not completely detectable.

The operator has a number k of reference models of pre-defined stress profiles. These models are obtained from for example digital translations of video captures.

Information about the nature of the flatness fault can be used to design the flatness control algorithm to concentrate on compensating zones where the problem is most significant. If for example the strip has the pattern "wave edges" the actuators need to compensate strip edges rather than the center.

The present invention proposes that there is established a one-to-one mapping: each reference model of the pre-defined stress profiles has associated a matrix that describes the weight of each measurement zone for the flatness error correction. These weight matrices are used in the flatness control algorithm.

The operator, or a pattern matching software, decides witch reference model is best to use. The reference model is mapped to one of the weight matrices. This mapping is the second vector space mapping, and it is a key element of this invention.

There are some patents from e.g. Hitachi/Siemens, that use certain pattern matching techniques. However, these patents are focused on the use of certain algorithms (fuzzy, neuronal nets) for enhancing measurement and are not referring to the control algorithm as this invention does. In other words, these patents claim improvements in what we call the first space mapping. By contrast, the present invention claims that substantially increased flatness control accuracy can be achieved by the dual space mapping.

Mathematically, that means each reference model $M_i$ (where i is the index of the model), is mapped to a unique matrix $K_i$. The matrix $K_i$ is a square matrix of size N×N (N being the number of measurement zones). The matrix has zero in all positions except the main diagonal, where there is the weight desired for the action of actuators on the particular zone of size.

The near-continuous space obtained after morphing, gives, after a measurement sampling, a degree of prediction since the continuous subspace between two samples is now available. The prediction horizon is equal to at least the size of the reference strip model. That means the control algorithm can be improved in this strip region, by performing an autoregressive control scheme. The operator has the visualization and command possibilities as shown schematically in FIG. 6.

The strip is generated on the operator station using computer graphics tools (shadowing, material texture, translations etc). The strip is shown moving, in the same fashion as a video would show (so called virtual reality). The input to this function is the measured data from the measuring roll and the morphed surface. The measuring sensors touch the strip e.g. in the positions denoted as A, B, C, D in FIG. 7. The reference model used for morphing has a length 1. FIG. 7 shows the case when the prediction horizon is 1. This length covers 3 measurement samples A, B and C. The colors within the prediction area are mapping the difference between the actual measurement and the predictive values, in the usual way done with loggers, Matlab programs etc. For example red color means large error, yellow means medium, green is low error and the colors have gradients in between. The mill operator, by modifying the prediction horizon in the range [0, 1], and the morphed reference model, can verify which case is best suited for rolling.

To summarize, the invention involves the following;
a second mapping—from reference models to output space optimization matrices—virtual strip is directly mapped to a vector space optimization algorithm,
reference models enter into the computation of the main mapping—the measured flatness vector is enhanced with information from the virtual strip using a morphing technique,
use of reference pictures/models/descriptions of the strip to enhance flatness error—morphing technique,
use of reference pictures/models/descriptions of the strip with an associated weight matrix to concentrate on compensating zones where the problem is most significant, space change.

The method according to the invention may, at least partly, be performed under control of a set of computer readable instructions or code means contained in a computer program storage device for making a computer or processor perform any of the steps of the above described method.

The invention may also use a computer readable product for carrying out the method according to the invention.

While the present invention has been described in terms of the preferred embodiments, the invention is not limited thereto, but can be embodied in various ways without departing from the principle of the invention as defined in the claims.

The invention claimed is:

1. A method for optimizing measurement and control of the flatness of a strip of rolled material, the method comprising:
measuring a flatness of the strip,
obtaining a visual image of the strip,
determining a relevant flatness fault type by comparing the visual image to one or more reference strip models for known flatness fault types, fusion or morphing the measured flatness with the determined relevant flatness fault type, and controlling flatness by comparing the fused or morphed measured flatness with a target flatness profile to determine a flatness error.

2. The method according to claim 1, further comprising:
making a mapping between measurement and control by associating to relevant flatness fault types a reference strip model and the actuator space conversion matrix.

3. The method according to claim 1, further comprising:
making an enhanced mapping between measurement and control by an actuator correction algorithm using morphed information.

4. The method according to claim 1, further comprising:
mapping each reference strip model to a corresponding vector space conversion matrix according to the flatness fault type.

5. The method according to claim 1, further comprising:
selecting a reference strip model by comparing available reference strip models with the strip.

6. The method according to claim 5, further comprising:
enhancing the measured data by interpolating the reference model with measured flatness data.

7. The method according to claim 6, wherein the measured data is enhanced by using morphing.

8. The method according to claim 1, further comprising:
creating a set of space conversion matrices, which are known to correct the known flatness fault types by optimally qualifying actuator behavior during flatness control for the given flatness error type, choosing an associated actuator space conversion matrix, and optimizing the flatness control with the space conversion matrix.

9. The method according to claim 1, further comprising:
converting the visual image of the strip to a visualization format used for the reference strip models.

10. The method according to claim 1, further comprising:
having visual access to the strip by an operator.

11. The method according to claim 9, further comprising:
comparing the reference strip models with the strip visualization format.

12. The method according to claim 11, wherein the comparison is carried out automatically, the method further comprising:
manually tuning an automatic comparison.

13. The method according to claim 1, further comprising:
synchronizing measured data with video samples and with a currently performed optimization algorithm.

14. The method according to claim 1, further comprising:
using a morphing technique.

15. The method according to claim 4, further comprising:
morphing from the reference model to the measured data by adding a result of the mapping to the reference model.

16. A device for optimizing measurement and control of the flatness of a strip of rolled material, the device comprising:
a flatness measurement device configured to measure a flatness of the strip,
a visualization device configured to obtain a visual image of the strip,
a comparison device configured to determine a relevant flatness fault type by comparing the visual image to one or more reference strip models for known flatness types,
a morphing unit configured to fuse or morph the measured flatness with the determined relevant flatness fault type,
a flatness control configured to control flatness by comparing the fused or morphed measured flatness with a target flatness profile to determine a flatness error.

17. The device according to claim 16, wherein the flatness control is configured to associate to relevant flatness fault types a reference strip model and an actuator space conversion matrix.

18. The device according to claim 16, wherein the flatness control is configured to make a mapping between measurement and control.

19. The device according to claim 16, wherein the flatness control is configured to make a mapping between measurement and control by an actuator correction algorithm.

20. The device according to claim 16, wherein the flatness control is configured to make a mapping each reference strip model to a corresponding vector space conversion matrix according to the flatness fault type.

21. A computer program product, comprising:
a computer readable medium; and
computer program code means recorded on the computer readable medium and executable by a processor for carrying out the steps of
measuring a flatness of the strip,
obtaining a visual image of the strip,
determining a relevant flatness fault type by comparing the visual image to one or more reference strip models for known flatness fault types,
fusion or morphing the measured flatness with the determined relevant flatness fault type, and
controlling flatness by comparing the fused or morphed measured flatness with a target flatness profile to determine a flatness error.

22. The computer program product, according to claim 21, wherein the computer program code means is for carry out the further step of at least partially providing the computer program through a network.

23. The computer program product, according to claim 21, wherein the computer program code means is for carry out the further step of at least partially providing the computer program through the internet.

* * * * *